United States Patent
DeVries

(10) Patent No.: US 7,810,788 B2
(45) Date of Patent: Oct. 12, 2010

(54) BELT LIFTER APPARATUS

(75) Inventor: Brett Edwin DeVries, Comstock Park, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 853 days.

(21) Appl. No.: 11/531,202

(22) Filed: Sep. 12, 2006

(65) Prior Publication Data

US 2008/0060909 A1    Mar. 13, 2008

(51) Int. Cl.
*B66F 3/08* (2006.01)
(52) U.S. Cl. ........................ 254/126; 254/122
(58) Field of Classification Search .............. 254/126, 254/122, 124, 133 R, 134
See application file for complete search history.

(56) References Cited

U.S. PATENT DOCUMENTS

2002/0072317 A1* 6/2002 Livingston et al. ............ 452/53
2003/0047388 A1* 3/2003 Faitel ......................... 187/214
2008/0060909 A1* 3/2008 DeVries ...................... 198/300

* cited by examiner

*Primary Examiner*—Lee D Wilson
(74) *Attorney, Agent, or Firm*—Fitch, Even, Tabin & Flannery

(57) ABSTRACT

In one form, a belt lifter apparatus provides increased lifting force and belt lift height by a scissors mechanism having crossed lifting arms each having a translatable end and having a translatable pivot axis between the lifting arms. Preferably, other ends of the lifting arms are fixed to an upper belt lifting member and to a lower support base member at locations such that the pivot axis translates to a position located substantially at the center of the lifted belt when the belt is lifted to the highest lift height. Lightweight, aluminum tubular members are used for the lifting member and the base support and each includes a track for supporting the translatable ends of the lifting arms. The span width of the base member is adjusted by sliding telescoping, tubular legs within the base tubular element. Pivoted wing arms are supported by braces extending to the belt lifting member.

13 Claims, 7 Drawing Sheets

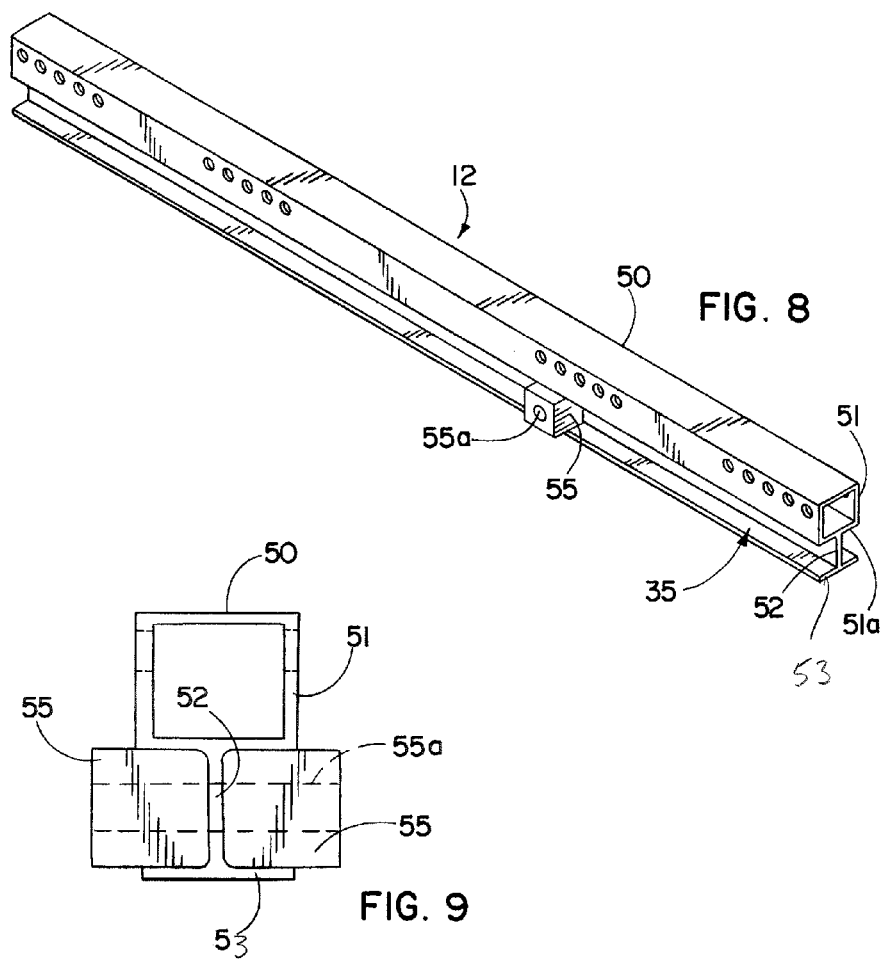
FIG. 8
FIG. 9
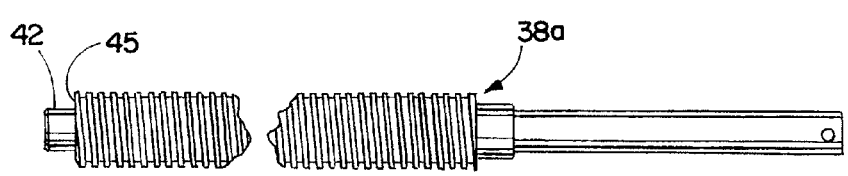
FIG. 10

BELT LIFTER APPARATUS

FIELD OF THE INVENTION

This invention relates to an apparatus for lifting conveyor belts and more particularly to an apparatus for lifting tensioned conveyor belts usually for replacement of a roller located beneath the belt or to allow splicing of the belt or a repair of a rip or a tear in the belt.

BACKGROUND OF THE INVENTION

The replacement of a conveyor roller is a difficult task in that the conveyor belts that need to be lifted off of rollers are usually troughed and tensioned and may be quite wide, for example 60 inches in width, and may also be on an incline. For this purpose, a belt lifter often has to be placed on the supporting frame for the conveyor within a confined space. While current belt lifters lift the belt as much as ten inches, it would be desirable to lift the belt higher than ten inches to provide adequate space for easy removal of a conveyor belt roller, for instance. Because the conveyor belt lifters are used in the field for relatively large troughed, conveyor belts, although the lifter also could be used for non-troughed conveyor belts, the lifter has to be easily portable and preferably light weight so that it can be carried to the place of roller replacement or where it is desired to create a splicing station for a repair of a belt rip or to provide a splice for the belt. A splicing station is usually created by lifting the belt until it is flat with the trough removed; and then a piece of plywood is slipped under the belt between the belt and rollers or the belt lifter to create a splicing station.

The belt lifter should be safe and stable for commercial usage in that it should resist toppling or rolling over, and the belt lifter needs to be easily centered and operated. One commercially marketed conveyor belt lifter is able to lift about 880 kilograms or roughly 2300 pounds; however, it would be desirable to provide even greater lifting force. One belt lifter manufacturer provides two different sizes of belt lifters with the heavier or larger size providing the 2300 pounds of lifting force and approximately 10 inches of vertical travel or lift height for the belt. Another manufacturer provides a lift capacity of about 1000 kilograms and provides approximately 10 inches of vertical lift. Providing additional vertical lift is difficult in that the belt tension and therefore the downward force exerted on the belt lifter increases substantially for each inch beyond the current 10 inch lift provided by commercial belt lifters. That is, the belt lifter is working against increased downward loading from the tensioned belt as the belt continues to be raised vertically higher. Therefore, especially with wider belts it may be important that the belt lifter be stabilized and the belt engaging member be raised parallel with the support substantially centered under such high lift loads.

One of the commercially available belt lifters is disclosed in Australian Patent Number 580705. As described in this patent, the lift is by a scissors-like jack mechanism which provides a mechanical advantage to provide the lifting force, but additionally has a stabilizing linkage assembly which insures that the belt engaging member is lifted parallel to the base support particularly if the load on the conveyor is somewhat off center. Preferably, the belt lifter is not only stable and provides a parallel lift capacity but it is also light-weight, stable, and has a low profile, for example seven inches or less, so that it can be fit into a confined space under the conveyor belt.

SUMMARY OF THE INVENTION

In accordance with a preferred form of the present invention, a light-weight and easily portable belt lifter is provided for raising tensioned conveyor belts, and particularly belts that are troughed, through a greater vertical lift and/or with increased lifting force than the previously described commercial belt lifters. By way of example only, the preferred belt lifter described hereinafter can provide about a 60% increase in lifting height over the current belt lifters. Additionally, the lifting force for this embodiment is rated at 4000 pounds verses the approximately 2300 pound capacity for prior belt lifters.

In accordance with one form, the belt lifter includes a belt lifting member to engage and lift the belt and a lower support which engages the frame for the conveyor and is supported thereby when lifting the tensioned belt by a scissors mechanism. The scissors mechanism includes crossed lifting arms crossed at a pivot axis between the lifting arms; and the pivot axis translates towards the lateral center of the belt upon application of a power input drive force to the scissor mechanism for raising the belt. Ends of the cross lifting arms also translate as the lifting arms pivot angularly relative to one another when raising the belt.

In a preferred form, each of a pair of crossed lifting arms has one end thereof which is translatable and the other end thereof which is fixed. One arm of the pair has its upper end exert an upward lifting force to the lifting member pushing the belt up while its opposite end is fixed to a lower base support element. The other lifting arm has its upper end fixed to the lifting member and its lower end translatable along the lower base support element.

In accordance with another form, the fixed ends of the lifting arms of the scissors mechanism are located at positions on the belt lifter such that at the greatest lift height, the translatable pivot axis is substantially centered beneath the lateral center of the belt with the upper ends of the lever arms being equally laterally spaced from the centerline of the belt. Thus, the belt load is centered on the belt lifter, and each side of the belt is being raised through equal distances thereby providing stability against tilting or rollover of the belt lifter.

In accordance with another aspect, the belt lifter has lightweight tubular supporting members which are adapted so that the belt lifter apparatus is adjustable in its width to suit different spans of conveyor frame supports on which the belt lifter is placed under the upper run of the conveyor belt. In this form, the support members may be a pair of telescoping tubular members which provides a smaller overall size for the belt lifter when the telescoping members are retracted inwardly and which allows the telescoping members to be pulled outwardly to the size desired to span conveyor frame supporting members.

In accordance with a further aspect, additional stability is provided by having a lower base support which is wider than the width the upper lifting element, preferably by providing a pair of spaced tubular support members on the base support for spanning a pair of spaced opposite main conveyor support beams. In this regard, the term "width" is orthogonal to the lateral width of the conveyor belt and is in the longitudinal direction along the belt or the direction of belt travel. The preferred tubular support members are hollow, boxed shaped, aluminum extrusions which may have telescoping tubular legs to provide an adjustable, conveyor spanning width for the belt lifter.

In accordance with another aspect, the overall weight of the belt lifter is kept to a minimum to make it portable and yet have the desired strength for lifting heavy loads by having both the upper lifting member and the lower base support each formed of elongated, hollow tubular members of aluminum. The preferred tubular members are aluminum extrusions which also include an integral, extruded track on which ends of the respective lifting arms translate.

In accordance with another form, the belt lifting member is provided with adjustable wing arms of increased strength to support the inclined, trough forming sides of the belt during the belt lifting operation. This is achieved by providing adjustable braces that extend downwardly from an intermediate location along the length of the inclined wing arms to an end portion of the belt lifting member. Preferably, the braces, a portion of the wing arm, and the end portion of the belt lifting member form a strong triangularly shaped support or gusset for supporting the load to be applied to each wing arm. The braces may be pivoted at each of several different locations on upper ends to the wing arm and at lower ends to the end portion of the lifting member to provide a braced support for the wing arms at each of several angles thereby allowing positioning of the wing arms at substantially the same inclination as the particular inclination of the respective belt troughed portions to be lifted.

In accordance with the further form, there is provided a power input drive device comprising a drive screw which is constructed to shift the lifter to the desired maximum lift height configuration but which does not become overloaded as by trying to lift the belt higher should the screw be continued to be turned by a power input actuator such as a ratchet or the like. This limiting of the drive of the scissors mechanism by the screw drive is achieved by having a traveling nut which is driven by the screw drive leave the end of the thread on the screw once the belt support member has reached its maximum height lift; and then the force exerted downwardly by the belt on the scissor mechanism reengages the nut with the screw thread when the screw is turned in the opposite direction to lower the belt.

BRIEF DESCRIPTION OF THE DRAWINGS

FIG. 8 is a perspective view of the belt support member having a tubular member and depending track;

FIG. 9 is a cross-sectional view of the support member of FIG. 8 showing fixed, mounting blocks for upper fixed ends of the lifting arm members;

FIG. 10 is an elevational view of the drive screw;

DETAILED DESCRIPTION OF THE PREFERRED EMBODIMENTS

Figure 1:
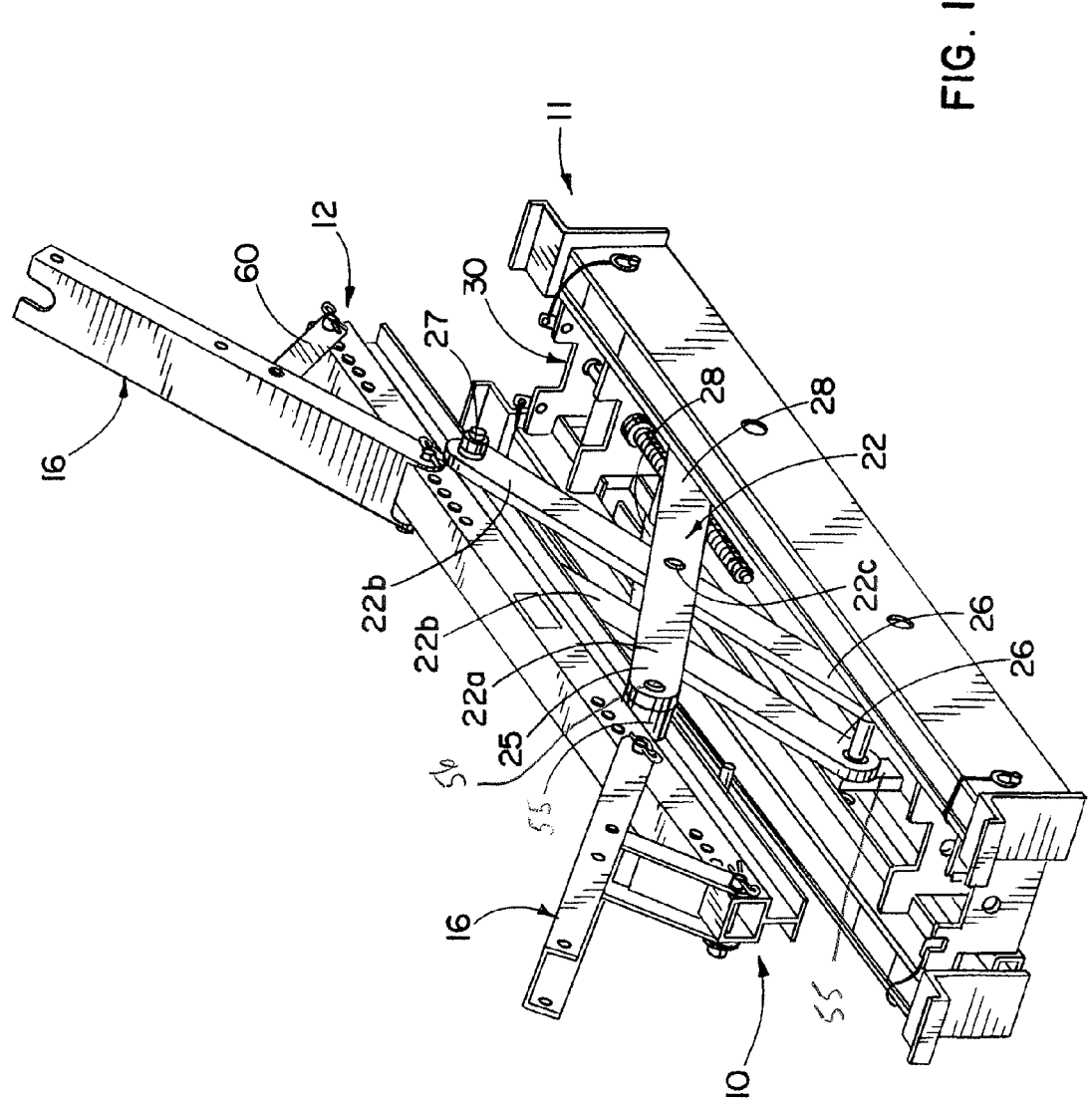
FIG. 1 is a perspective view of the belt lifter apparatus in accordance with one form of the present invention showing a scissor lift mechanism for raising a belt support member to lift a conveyor belt.
Figure 12:
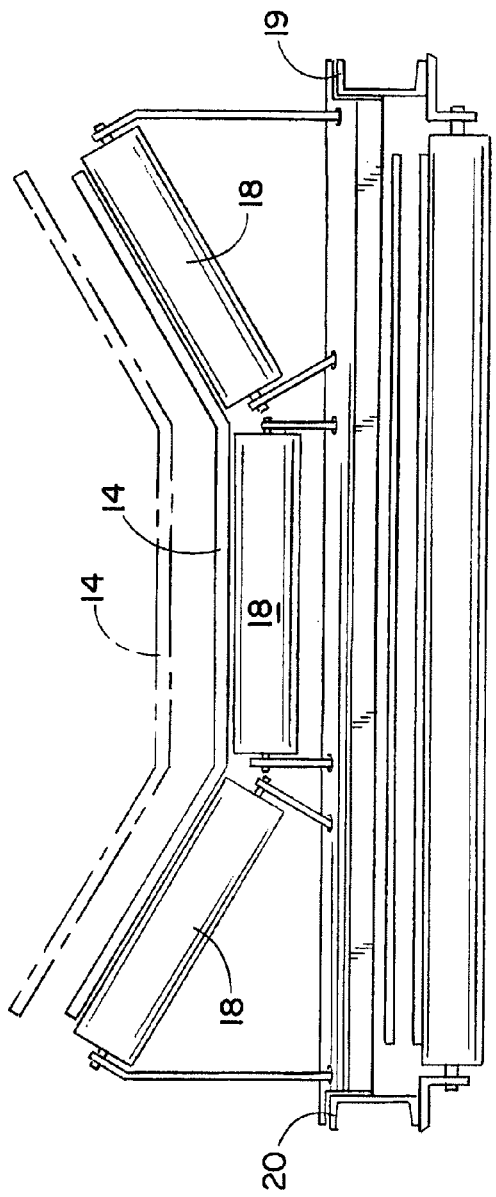
FIG. 12 is a diagrammatic view of a conveyor belt and conveyor main frame including side channel beams.

As shown in the drawings for purposes of illustration, the belt lifting apparatus 10 (hereinafter called "the belt lifter") is shown in FIG. 1 as comprising a lower support element or base member 11 which is adapted to be mounted on the conveyor frame and a upper support member 12 which is to be positioned under the troughed belt 14 (FIG. 12) or flat belt for lifting the belt vertically upward for the typical purposes of roller repair or for forming of a splicing station. A pair of adjustable, inclined support lifting, wing arms 16 at end portions 12b of the upper support member 12 engage and lift inclined troughed belt from the inclined side rollers 18, and a central portion 12a of the upper support member 12 lifts the central belt portion from the central rollers, as best seen in FIG. 12. Usually the belt lifter will be in a troughed belt configuration such as shown in FIG. 1 wherein the inclined lifting, wing arms 16 are at an incline to the central portion 12a of the upper support member, generally matching the inclination of the troughed inclined sides of the belt. This position is usually the one that is used to allow the belt to be lifted from the supporting rollers 18 which are then changed or otherwise repaired while the belt is still in a troughed position. After repair, the belt lifter mechanism is reversed in its direction of travel and the belt 14 is lowered back onto the conveyor support rollers 18. As shown in FIG. 12, the conveyor mechanism usually has a supporting frame with a pair of channels or side beams 19, 20 which run from one section of the conveyor belt to the next and continuously under or along the length of the conveyor with the rollers 18 being spaced at predetermined intervals, for example, five feet along the length of the conveyor. The roller spacing is dependent upon the belt width, which can be as much as 120 inches, the thickness of the belt, and the weight of the product being carried on the conveyor belt.

In accordance with the preferred and illustrated belt lifter 10, a scissors mechanism 22 is provided and configured to lift up to approximately 4,000 pounds by way of example and which is able to lift the belt substantially above the usual ten inch height of the commercially available prior belt lifters. The illustrated belt lifter may lift the belt 14 inches. The above examples are given by way of illustration and not by way of limitation and these examples are provided to afford an appreciation of the significant benefits and increased advantages of the present belt lifter 10 over the above described, commercially available prior belt lifters.

Figure 2:
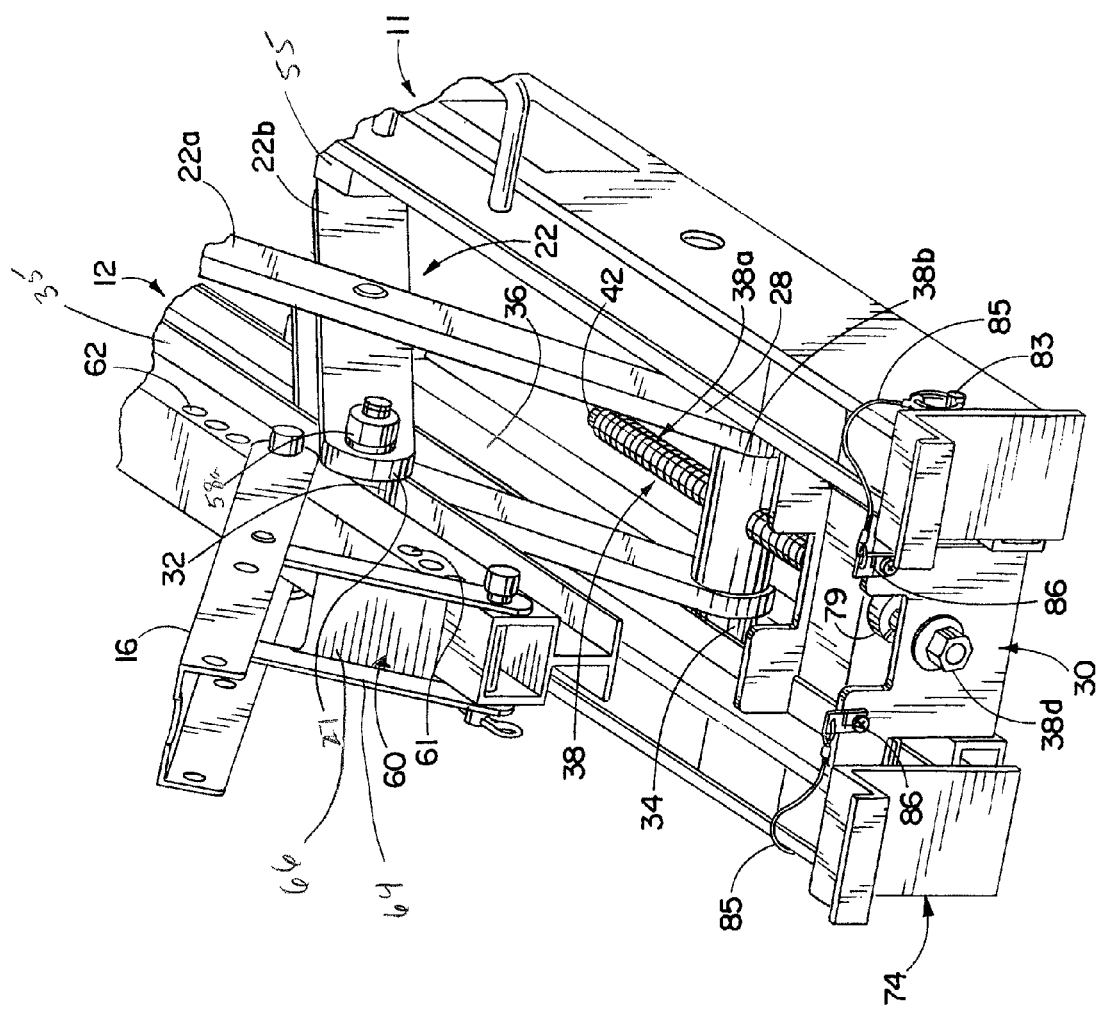
FIG. 2 is an enlarged fragmentary perspective view of the power input side of the belt lifter illustrated in FIG. 1.

The illustrated scissor mechanisms has cross lever or lifting arms 22a and 22b which are joined at a pivot axis 22c for angular movement relative to one another and which are configured so that the pivot axis 22c translates relative to the base support member 11 mounted to the conveyor side beams 19, 20 as the belt lifting member 12 is moved vertically relative to the lower support member 11. The lifting arm 22b is provided with an upper end 27 which is moveable or slideable along the upper support element 12 and translates as the pivot axis 22c translates, and likewise a lower end 28 of the lifting arm 22*a* also translates with application of power through a power input or drive device 30 which actuates the crossed lifting arms 22*a* and 22*b* to translate and move angularly relative to one another. Preferably, each of the crossed lifting arms 22*a* and 22*b* include pairs of crossed lifting arms 22*a* and 22*b*, as can be seen in FIGS. 1 and 2. As the ends of the lifting arms come closer together, the mechanical advantage increases so that there is increased lifting force with the same power input as the tension in the belt is being increased. That is, to avoid lengthy time delays and expense, the tension on the endless conveyor belt is not released when raising the belt. A significant lift height such as 16 inches, which may be provided by the illustrated belt lifter, increases the tension on the belt and thereby increases the downward force being applied by the belt on the lifting mechanism. Thus, the mechanical advantage provided by moving the respective upper and lower lever arm ends closer together when the belt is raised is advantageous for ease of operation of the present belt lifter 10 since the downward force on the lifter 10 progressively increases with increasing lift height.

To insure that the belt is being raised in a stable condition or orientation with the upper belt support member 12 being maintained substantially parallel to the lower support member 11, the upper end 25 of the lever arm 22*a* and the lower end 26 of lever arm 22*b* are fixed to the upper and lower support members 11 and 12, respectively, and do not translate such that the pivot axis 22*c* is moved to a generally laterally centered position belt between lateral belt sides and under the belt when the belt lifter and its scissor mechanism is in its fully raised configuration, and the belt is raised to its maximum height. This will typically correspond with the centers of the lower support member 11 and the belt lifting member 12, particularly the horizontal center portion 12*a* thereof. Stated differently, the pivot axis 22*c* is positioned outwardly from the center of the conveyor belt by the maximum extent when the lever arms of the scissor mechanism are lowered and the belt lifter is at its smallest height or fully lowered configuration which will be approximately 6¾ inches with the illustrated form of the belt lifter 10. It is understood that the space underneath the belt and over the tops of the supporting beams 19 and 20 can be quite limited in some applications or conveyor systems so that the device needs to be lightweight as well as compact and small to be positioned underneath the upper conveyor belt run. The conveyor belt run also may be on an incline rather than being in a horizontal plane as the material is being conveyed upwardly or downwardly along an incline from one station to the next station.

The improved stability accruing from having the translating pivot axis 22*c* centered at about maximum lift height is more important for wide conveyor belts of 36 inch width or greater than for lesser widths of conveyor belts such as 30 or 24 inch wide belts. Another embodiment of the invention may be provided for smaller width belts such as having a width less than thirty six inches, for instance, with the translating pivot axis being more centered with respect to the belt and belt lifter when the belt lifter is collapsed to its most compact or smallest size. In this version of the belt lifter, as the belt lifter scissor mechanism 22 is operated by the power input 30 to raise the belt lifting member 12, the pivot axis translates away from the center of the belt to an off-center position as the smaller width belt is raised to its maximum lift height. An advantage of having the translating pivot axis 22*c* centered initially at the fully lowered configuration or collapsed height for the belt lifter is that the belt lifter can be made more compact, because of its overall height, when fully lowered or collapsed, in order to be inserted into a small space beneath the smaller width belt.

In accordance with another aspect of the belt lifter 10, the upper end 27 of the lifting arm 22*b* and the lower end 28 of the lifting arm 22*a* are each provided with rollers 32, 34 (FIG. 2) which roll along tracks 35 and 36 so as to provide low friction surfaces for these arm ends which are translating along the track 35 on upper support member 12 and the track 36 on the lower support member 11 of the belt lifter.

The power drive input 30 operably connected to the scissors mechanism 22 for actuating the scissors mechanism may take various forms. Herein, a low cost effective power input actuator comprises a linear drive in the form of a power screw device 38 (FIG. 2) which has one end 38*d* which is adapted to be turned by ratchet mechanisms (not shown) such as a power operated tool or by a long, manually operated lever arm. In this regard, the drive end may include a hex nut 38*d*. The power screw device 38 comprises an elongated horizontal disposed, helical threaded screw shank 38*a* which is mounted to the lower support member 11 for rotation while at a fixed, non-translatable position. A threaded nut assembly 38*b* which is non-rotatedly supported via the lower ends 28 of the pair of parallel lifting arms 22*a*, is threadably engaged with the screw 38*a* so that rotation of the helical screw causes the nut to translate and the attached ends 28 of the lifting arms 22*a* to also translate therewith. In this manner, nut assembly 38*b* acts as a linear drive member that travels linearly upon actuation thereof for driving the crossed lever arms 22.

The rollers 34 on the lower ends 28 of the parallel arms 22*a* roll along the lower tracks 36 in a generally horizontal plane as shown in FIG. 2 while the upper ends 27 of the lifting arms 22*b* are raising due to the force pushing on the lever arms 22*b* by a pivot shaft 22*d* (FIG. 3) at the translatable pivot axis 22*c*. The fixed ends 25 of the lever arms 22*a* are also being forced upwardly by the pivot shaft 22*d* as the lower ends 28 of arms 22*a* are moved inward toward the fixed ends 26 of arms 22*b* by the power input device 30. Manifestly, other forms of actuators such as hydraulics, pneumatics or other power devices could be used rather than the power drive screw 38 to move the lower end 28 of the lever arms 22*a* to achieve the same lifting as has been described above.

In the preferred illustrated form, an overdrive of the lifting device beyond the maximum desired height from both a lifting capacity standpoint and also from a stability standpoint is avoided by having the power drive screw 38*a* automatically disconnected or disabled from further lifting drive of the upper member 12 above a predetermined height, for example, about 14 inches in this example. To this end, the nut 38*b* can translate along the entire predetermined length of the helical screw 38*a* to its non-threaded portion 42, which does not have a thread thereon, as best seen in FIG. 10. When the nut reaches this unthreaded end 42, the nut idles and stays at the screw end 42 even though the screw continues to be turned by the ratchet nut 38*d* which is pinned to the input end of the drive screw 38. The ratchet nut 38*d* can receive a ratchet of a manual lever or a power impact wrench. The force of the raised belt and tension on the belt will hold the translatable nut against the first helical thread portion 45 (FIG. 10) adjacent the unthreaded end 42 of the drive screw such that when the screw thread is turned in the reverse direction, the first thread 45 adjacent the free end portion 42 of the screw 38*a* reengages with the nut and the nut is then translated back along the screw shaft 38*a* rotating in the opposite direction. Herein, the screw is rotated in the clockwise direction to lift the upper support member 12 and is rotated in the opposite rotary direction to lower the upper support member and the belt.

Referring now in greater detail to the individual elements comprising the illustrated belt lifter 10, as best seen in FIG. 8, the upper support member 12 preferably comprises a elongated, hollow tubular support 50 to which is integrally attached the upper tracks 35 on which the pair of rollers 32 on the upper ends 27 of the lifting arms 22b travel. Herein the upper lifting member is in the form of a extrusion which has an elongate box-like portion 51 having a box shape in cross-section which provides great strength and is light weight due to its hollow interior. A central depending web 52 integral with lower sidewall 51a of the box portion carries an integral horizontal flange 53 at its lower end to form the upper tracks 35. In this manner, there are opposite laterally opening upper tracks 35 with opposite rollers 32 supported on the flange 53 on either side of the web 52.

The upper and lower fixed ends 25 and 26 of the lever arms 22a and 22b are disposed toward the far or distal ends of the respective support member 12 and 11 along their length while the upper and lower translating ends 27 and 28 of the lever arms 22b and 22a are disposed toward the near or proximate ends thereof adjacent the power input end 30 of the belt lifter apparatus 10. For mounting the upper pair of fixed ends 25 to the upper support member 12, mounting blocks 55 are secured to the upper tracks 35 as by welding at a predetermined position along their length which is coordinated with the length of the scissor arms 22 to achieve the maximum lift height desired when the arms 22 are power driven to their highest, raised configuration. As best seen in FIG. 8, the mounting blocks 55 fit between the lower sidewall 51a and the flange 53 and can abut depending web 52. The mounting blocks 55 have laterally extending bores 55a, and the arm upper ends 25 have apertures to be aligned with the bores 55a for receiving a fastener such as rivets 56 that fix the ends 25 to the blocks 55 at the inner sides of the arms 22a with the fastener shaft acting as a pivot shaft to allow for pivoting of the arms 22a thereabout during lifting and lowering operations with the belt lifter 12. A similar block mounting arrangement can be provided for the lower pair of fixed ends 26 of the arms 22b with the blocks 55 fixed on the laterally inwardly opening tracks of the lower support member 11 described hereinafter so that the arms 22b are fixed at their outer sides to the fixed blocks 55 for pivoting and against translation.

Figure 3:
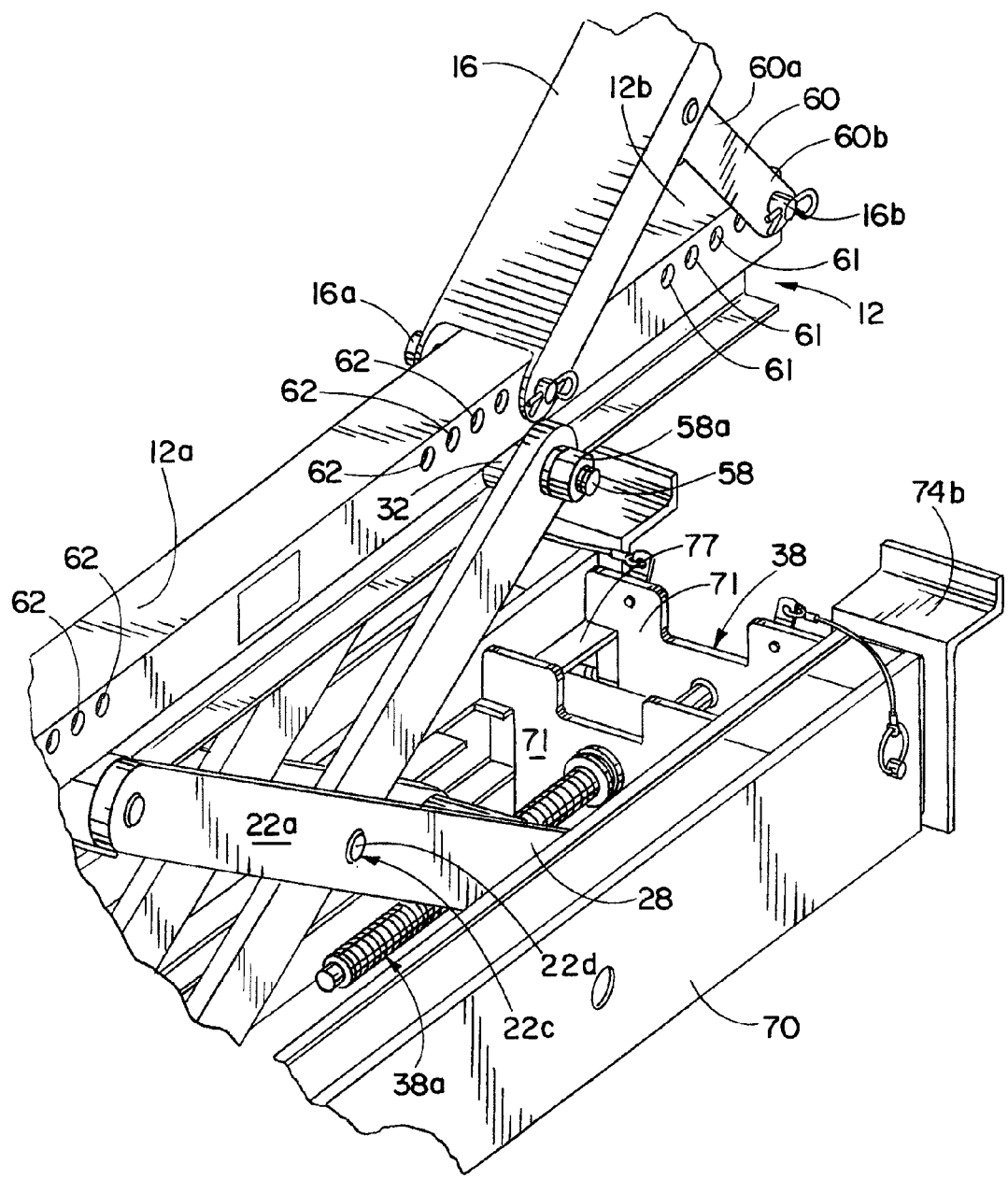
FIG. 3 is a perspective view of a scissor drive device including a threaded screw.

The translating upper and lower ends 27 and 28 of the lever arms 22b and 22a have the rollers 32 and 34 rotatably mounted thereto, as previously discussed. As can be seen at FIGS. 2 and 3, the upper rollers 32 are rotatably secured on the inside of the arms 22b to fit in the laterally outwardly facing tracks 35. For this purpose, a nut 58a can be threaded onto the projecting threaded end of an axle 58 extending though aligned openings in the arm, 22b and associated roller 32 secured for rotation to and about the axle 58. The lower rollers 34 are rotatably secured at the outer sides of the arms 22a at the lower ends 28 thereof for fitting in the laterally inwardly opening tracks of lower support member 11 with the nut assembly 38b aligned therewith and extending between the inner sides of the arms 22a, as can be seen in FIG. 2. Since the nut assembly 38b is fixed between the lower ends 28 of the arms 22a, it will not rotate when the screw 38a is turned and instead will translate along the screw 38a for actuating the lower arms 22, as has previously been described.

As stated earlier, the position of the mounting blocks on the upper support member 12 is predetermined so that the cross lever arms 22a and 22b, when they are in their upper or raised configuration or position, have their translatable pivot axis 22c close to the center of the lower support member 11 and the upper support member 12 along the lengths thereof, and the center of the width of the belt lifted by and supported on the member 12. The illustrated upper hollow tubular support 50 of FIGS. 8 and 9 is of an extruded aluminum material, for example, an aircraft aluminum 6005-T5 which is light weight and still has a high strength construction. The extruded shape allows the lower rail portion which forms the tracks 35 on either side for the rollers 32 to provide horizontal rolling surfaces which will withstand a heavy load. Rather than being formed integrally, the tracks 35 can be formed separately and attached to the support member 12 and, of course, the material may be changed from the aluminum preferred to be used in this embodiment to provide the lightweight and strength which are desirable for this portable type of apparatus.

Improved support for the inclined lifting wing arms 16 mounted on the opposite ends of the upper support member 12 is provided by an inclined, pivotal brace 60 (FIGS. 1 and 3) which is connected at its upper end 60a to the lifting arm at a location spaced upwardly from the lifting wing arm lower pivot axis at pivot bolt pin 16a. The lower end 60b of the brace 60 is connected at a pivot axis at bolt pin 16b located in one of a series of horizontal apertures 61 through the vertical sidewalls of the upper support member in the outer end portion 12a thereof, as seen in FIGS. 3 and 8. It will be seen that the braces 60, the lower portions of the inclined lifting wing arms, and the end portions 12b of the tubular support 50 between the lower ends of the wing arms and the braces constitute adjustable gussets or triangular support assemblies. These opposite, adjustable gussets or triangular support assemblies are an improvement over the prior art wing arms where there was merely a pin on the lower end of the inclined wing arm resting on the top of the top support member leaving a large portion of the inclined wing arm unsupported and thus more prone to being bent or otherwise deformed due to the high lifting forces being applied through a long lever arm between the pin and the outer upper end of the inclined lifting arm.

The pivot bolt or pin 16a spaced inwardly from the other end of the support 12 relative to pivot pin 16b may be adjusted or positioned in each of a series of inward holes 62 in the central portion 12a of the tubular support 50 depending upon the width of the belt and the inclination needed for the wing arms 16. The braces 60 can have an elongated channel configuration with a pair of side bars 64 interconnected by a plate 66. Thus, there is provided an improved, stronger inclined lifting arm braced and providing a triangular support to be configured generally to that of the troughed configuration of the particular belt being lifted.

Figure 4:
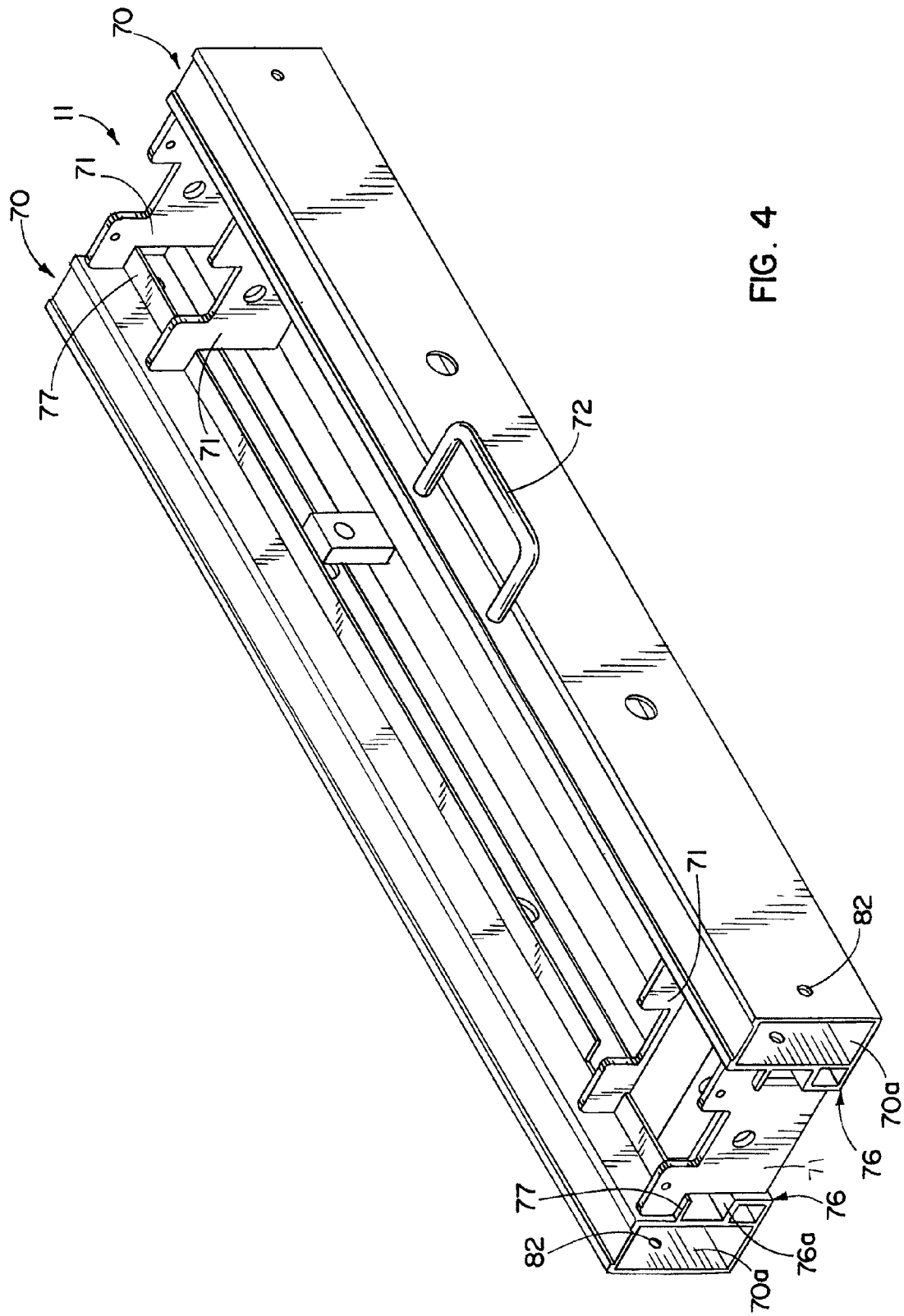
FIG. 4 is a perspective view of a support base assembly for supporting the belt lifter apparatus when in use showing a pair of spaced, tubular support members.

To provide light weight and strength, the lower support member 11 is preferably formed as a base assembly comprising a pair of spaced apart tubular or box-shaped members 70 (FIG. 4) formed of the same lightweight and strong aircraft aluminum as is the upper support member 12. As best seen in FIG. 4, the base assembly comprises a left and right hand box-shaped extruded tubular members 70 which are spanned by four cross plates 71 having opposite, lateral ends fastened as by welding to the respective tubular members to interconnect the completed assembly. The elongate, tubular upper support member 12 generally extends centrally between and above the two spaced tubular members 70 of the lower base assembly 11 to provide a larger base extending on either side of the upper, load supporting and lifting member 12. For the sake of portability, this lower base assembly 11 is also provided with an outwardly, laterally extending carrying handle 72, as best seen in FIG. 4.

Turning now to a description of the base tubular elements 70, because they are mirror images of one another only one will need to be described in detail to have an understanding of the other base element. As best seen in FIGS. 1, 4, 6 and 7, the box-shaped tubular elements 70 have a hollow interior 70a for receiving the extendible legs 74 which preferably telescope in and out of the hollow interiors for the desired spanning of the conveyor support cross beams, as will be described further hereinafter.

Figure 5:
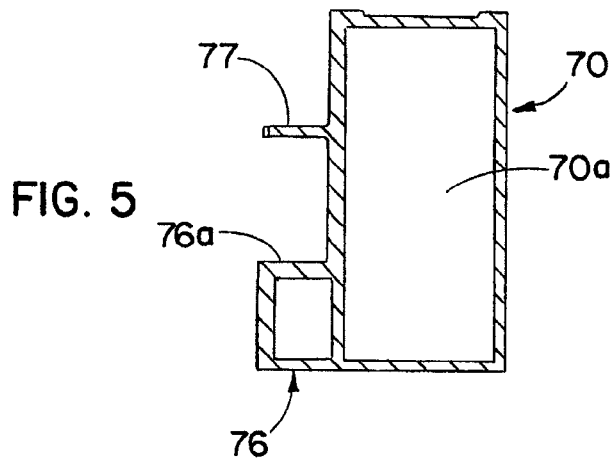
FIG. 5 is a cross-sectional view taken through one of the support members showing its box-shaped, internal hollow space, and an integral side track.
Figure 6:
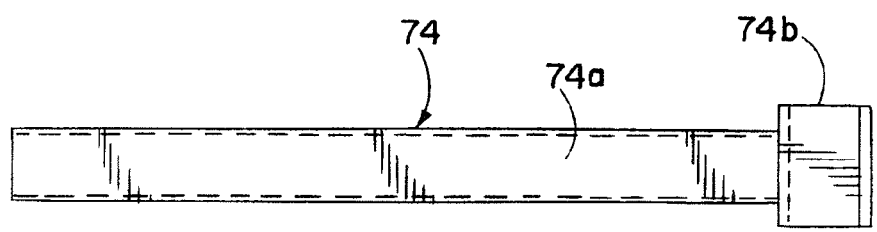
FIG. 6 is a plan view of a telescoping, extension leg for fitting in the hollow, box-shaped, support member of FIG. 5.
Figure 7:
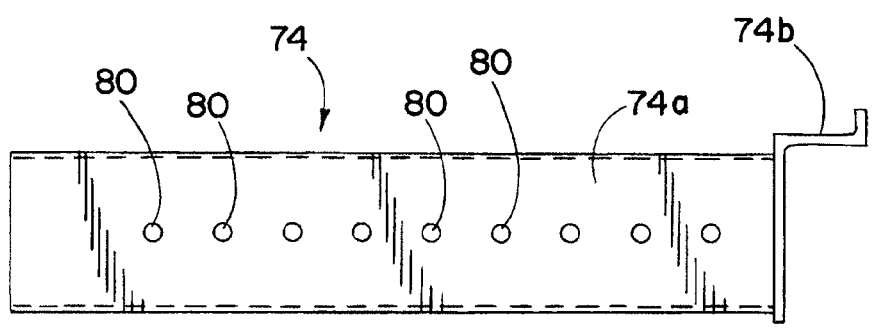
FIG. 7 is a side elevational view of the extension leg shown in FIG. 6.

To provide the track lower surface or the lower support 11 each of the lower support, tubular elements has a box-shaped, laterally inward extending projection 76 having an integral upper web or side 76a (FIG. 5) which is horizontally disposed and parallel to an upper integral track flange 77 extending laterally inward from the tubular element 70 above the box projection 76. The upper side 76a of the inwardly projecting, box projection forms the lower track surface on which the lower roller 32 of the lifting arm 22b will roll. The roller 34 is trapped or captured between the lower track surface 76a and the upper track flange 77 for rolling therebetween. Thus, from a strength standpoint it is preferred to have roller tracks that are integrally formed during extrusion of the tubular elements 70 and 76. However, the tracks could be otherwise formed separately and welded or otherwise secured to the tubular members to provide the track on which the lower ends of the lever arms 22a either roll or slide to provide the desired translation for the cross lever arms of the scissors mechanism.

As best seen in FIG. 3, the cross or hanger plates 71 on the lower support element 11 are formed with holes centrally located to receive the drive screw 38a extending therethrough with the input drive end 38 of the drive screw projecting outwardly and having attached thereto a hex-headed nut 38d for receiving the drive actuator or drive ratchet, such as a power driven impact wrench or another type of lever device for turning the drive screw. The drive screw is supported at two places along its length by the cross plates 71, and a lock bushing 79, as best seen in FIG. 2, keeps the screw from traveling linearly in one direction and is fixed in position against linear travel in the opposite direction by the pinned drive nut 38d. Thus, only the nut assembly 38b travels with rotation of the screw 38a. The screw 38a is supported also by the translating nut 38b, the lower ends 28 of the arms 22a spanned by the nut assembly 38b, by the opposed rollers 32 and the tracks in which they ride, as well as the two hanger plates 71. The load from the translating nut and the rollers 34 and the fixed lower ends of the lifting arms 22a is transferred to the pair of tubular, support elements 70 and from the elements 70 to the telescoping legs 74, and on to the conveyor support beams 19 and 20. The other lower, fixed ends of the other lever arm transfer the load to the tubular elements 70 and telescoping legs 74 to the conveyor support beams 19 and 20.

The span or width of the belt lifter 10 under the conveyor belt may be increased from its minimal width where the telescoping legs 74 are positioned in a fully retraction position. The telescoping legs have a box-shaped tubular main body 74a with the end exposed from the tubular elements 72 having an attached hooking flange 74b which is adapted to be positioned over the top of the beam 19 or 20 so that the load is transferred from the base assembly at four points through the four leg extensions 74 to the main conveyor parallel beams 19 and 20.

The tubular bodies 74a of the extension legs have an outer dimension and size for telescoping within the hollow interior 70a of the respective tubular elements 70 of the base assembly member 11. To secure the legs at an adjusted span length, the legs are provided with a series of apertures 80 to be aligned with an aperture 82 (FIG. 4) in the vertical webs of the tubular members. As best seen in FIG. 2, locking pins 83 may be positioned through apertures in the vertical web holes in the respective tubular support elements 70. The pins 83 are preferably connected to the apparatus 10 by a tether 85 which is attached by a small bracket 86 to the proximal support bracket 71. The extension legs are also lightweight and strong and preferably made of the same aircraft, extruded aluminum heretofore described. From the foregoing it will be seen that the box-shaped extrusions provide a strong stable, wide base and provide a strong, well supported upper lifting element for supporting or lifting the conveyor belt.

Figure 11:
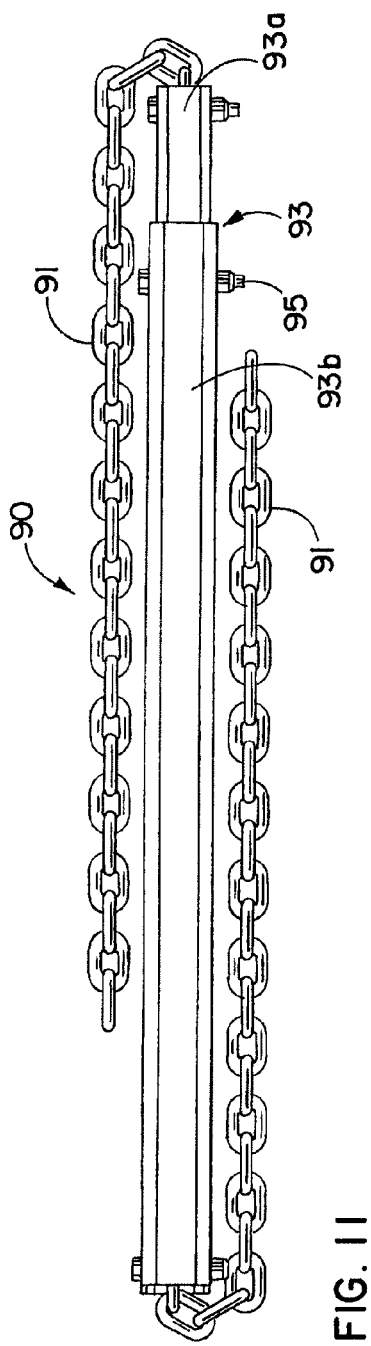
FIG. 11 is an elevational view of an adapter for the belt lifter having a chain for lifting a lower, return run of a conveyor belt.

Referring to FIG. 11, the belt lift 10 will usually be provided with a device or adaptor 90 for lifting the return or lower run of a continuous conveyor belt, often termed the return of the conveyor belt, which is located below the belt lifter, when it is desired to lift the belt return from the lower conveyor rollers while it is still tensioned to repair or replace the lower rollers or to do other repair work. A return lift bar 93 of the device 90 is attached to the upper lifting element 12 as by hooks or other devices at the free ends of a pair of suspension chains 91. The lower return lift bar 93 has a tubular construction, and is positioned beneath the belt return. Then when the scissor mechanism is operated by the power input 30, the upper belt lift element 12 through the chains 91 will lift the horizontal support tube 93 (FIG. 11) which lifts the belt return to be spaced above the rollers so that they can be attended to. It is preferred to make the return bar or tube 93 adjustable in length. In this regard, it is provided with a smaller telescoping tubular portion 93a which is fitted within the larger, outer main tubular portion 93b. The tubular portions 93a and 93b are provided with suitable apertures to receive a fixing bolt 95 through aligned ones of the apertures in the respective support large tube element and the extensible telescoping portion to lock the return lifter tube 93 at the desired length corresponding to or slightly larger than the width of the belt return being lifted.

While there has been illustrated and described a particular embodiment, it will be appreciated that numerous changes and modifications will occur to those skilled in the art and is intended in the intended claims to cover all those changes and modifications which follow in the true spirit and scope of the present invention.

What is claimed is:

1. An apparatus for lifting a conveyor belt, the apparatus comprising:

a belt lifting member configured to engage the belt and to lift and to lower the belt;

a lower support to support the belt lifting member and the lifted belt thereon;

a scissor mechanism having crossed lever arms with each lever arm having opposite ends and the lever arms being joined at an intermediate pivot axis for angular movement relative to one another;

one of the arms having an upper one of the ends mounted for translation and the other arm having a lower one of the ends mounted for translation with the pivot axis translating with the translation of the upper and lower ends of the arms;

a power input device operably connected to the scissor mechanism and configured to be operated to generate a drive force to actuate the crossed lever arms with the upper and lower ends and pivot axis translating and the arms moving angularly relative to one another for raising or lowering the belt lifting member;

upper and lower track members that are laterally open;

an upper roller of the one lever arm mounted at the upper end thereof for rolling on the upper laterally open track member;

a lower roller of the other lever arm mounted at the lower end thereof for rolling on the lower laterally open track member; and a linear drive member of the power input device that travels linearly for actuating the crossed lever arms and that is aligned laterally with the lower roller and the lower end of the other lever arm to which the lower roller is mounted during the entirety of the linear travel thereof to transmit the drive force from operation of the power input device to the lower roller.

2. An apparatus in accordance with claim 1 wherein the power input device including the linear drive member comprises:
   a threaded screw and nut configured to exert a pushing or pulling force on at least one of the lever arms as the screw is turned and the nut travels along the screw.

3. An apparatus in accordance with claim 2 wherein the threaded screw is secured against translation to the lower support and the nut actuates the lower translatable end of the other lever arm.

4. The apparatus in accordance with claim 1 wherein the one arm has a lower one of the ends that is fixed relative to the translatable upper end thereof, and the other arm has an upper one of the ends that is fixed relative to the translatable lower end thereof; and
   pivot connections at the upper and lower ends of each arm so that the fixed arm ends pivot as the translatable arms ends pivot and translate with the pivot axis translating and the cross arms undergoing angular movement to each other.

5. An apparatus in accordance with claim 4 wherein the fixed upper and lower ends of the lever arms are at predetermined positions relative to the lower support with the scissor mechanism in a fully lowered configuration such that the pivot axis translates toward and substantially into alignment with the center of the lower support and the belt with the scissor mechanism shifted to a fully raised configuration to provide a symmetrical, centered position of the crossed lever arms relative to the center of the belt for providing stability to the raised belt.

6. An apparatus in accordance with claim 5 wherein in the fully lowered configuration of the scissor mechanism the respective upper and lower lever arm ends are positioned at a wider spacing from each other than in the fully raised configuration of the scissor mechanism so that the ends of the lever arms each have moved closer to one another to thereby provide an increase in mechanical advantage for lifting relative to the wider spacing of the belt lever arm ends in the fully lowered configuration thereof.

7. An apparatus in accordance with claim 1 wherein the power input device is configured to provide a predetermined maximum lifting height for the belt and then is ineffective to raise the belt with a further input driving force from the power input device.

8. An apparatus in accordance with claim 7 wherein the power input including the linear drive member comprises:
   a threaded screw and a threaded nut, the threaded screw configured to disengage from the threaded nut to limit further raising of the lifting member beyond a predetermined maximum lifting height.

9. An apparatus in accordance with claim 8 wherein the threaded nut is adapted to reengage with the threaded screw with reverse rotation of the threaded screw to lower the lifting member and the belt thereon.

10. An apparatus in accordance with claim 1 wherein the belt lifting member and the lower support comprise:
    tubular members; and
    wherein the tracks are supported by the tubular members and have track surfaces for engagement with the rollers at the ends of the lever arms.

11. An apparatus in accordance with claim 1 wherein the scissor mechanism is configured to have a fully lifted configuration at which the belt is raised approximately 16 inches.

12. An apparatus in accordance with claim 1 wherein the scissor mechanism is operable to apply at least 4000 lbs. of upward lifting force to the belt.

13. An apparatus in accordance with claim 1 wherein the translating pivot axis shifts from a more centered to a less centered position relative to the lower support and the belt as the belt is lifted toward its maximum height.

* * * * *